Patented June 6, 1933

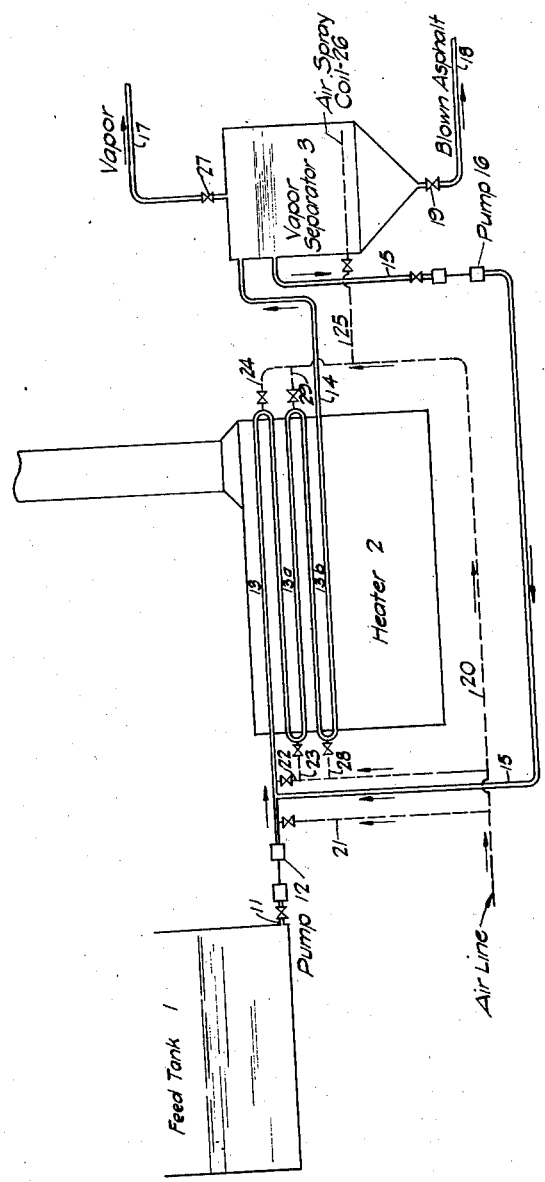

1,912,667

UNITED STATES PATENT OFFICE

HERMAN THEODOOR SWERISSEN, OF THE HAGUE, NETHERLANDS, ASSIGNOR TO SHELL DEVELOPMENT COMPANY, OF SAN FRANCISCO, CALIFORNIA

BLOWING ASPHALT

Application filed May 27, 1929, Serial No. 366,508, and in the Netherlands October 23, 1928.

My invention relates in general to the contacting of hydrocarbon products with certain gases to change the properties of the hydrocarbon materials, especially by oxidation.

More particularly my invention provides a continuous process for the blowing of asphalts, and apparatus to carry this process into effect.

Further features and advantages of my invention will appear from the following description thereof, as I have used it. It will be understood that I do not limit myself to the details of the particular method described for using my invention, but I extend my claims for the principle of my invention as far in scope and equivalents as the state of the prior art will allow.

It is general practice to blow heavy hydrocarbon products, as distillation residues, tars, and asphalts with air, oxygen, and other gases, to change their properties by oxidation. This blowing renders the asphalt harder, raises its melting point, and lowers the penetrability. Usually the blowing with air is done in batches in shell stills, which has several disadvantages. To overcome these I propose to use a continuous process by means of a tubular heater in which the contact of the air with the asphalt will be much more thorough.

The attached drawing by way of example illustrates more or less diagrammatically an apparatus for the continuous blowing of asphalts, designed to carry my invention into effect. The apparatus shown consists mainly of: feed tank 1, heater 2 and vapor separator 3.

In the operation of this apparatus the asphalt or other heavy petroleum product is pumped from tank 1 through line 11 to heater 2, by means of pump 12. In heater 2 the oil is heated by combustion gases, while passing through the heating tubes 13, 13a, 13b, etc., which form a continuous coil. The hot asphalt leaves the heater through line 14 and is passed to the vapor separator 3, in which the vapors of light products, air, and gases are removed through valve 27 and line 17. Part of the asphalt is recirculated through line 15 by pump 16, and introduced again in the feed line 11, the other part is removed as finished product through valve 19 and line 18. The air blowing is effected through the air system, consisting of air main 20 with branches 21, 22, 23, 24, 25, 28 and 29.

It will be seen that the asphalt may be contacted with air already in the feed line, and the blowing can be continued, if desired, even in the vapor separator by means of perforated coil 26. The heavier finished product is taken off from the bottom of the vapor separator, the partly finished product is taken from an intermediate point of the separator and recirculated to complete the oxidation. If desired, the asphalt in tank 1 may be preheated and also the air injected. When starting the operation, valve 19 is kept closed until the circulated asphalt shows the desired properties; thereafter a regulated quantity of fresh asphalt is continuously pumped in from the feed tank, and a corresponding quantity of finished product removed from the cyclic circulation in the apparatus, through line 18.

While the foregoing is a general description of the apparatus to carry out the operation of my invention in its simplest form, it will be understood that in actual practice more parts are required as desirable which for the clearness of the description have been omitted here, as these can be readily supplied by those skilled in the art. Such equipment may comprise heat exchanging apparatus, air compressors, automatic control of liquid levels, of temperatures and pressures, different recording instruments, etc.

The temperature, the time of circulation, the rate of feed etc. will depend on the qualities of the asphalt used and of the product desired, especially the melting point; a temperature around 470–570° F. is often suitable. The amount of internal heat of reaction will often be so high that the external furnace temperature can be lowered considerably, after the process has been in operation for some time. The quantity of air and the time of oxidation can be regulated accurately according to the product desired by means of the various air injectors which can be cut out independently of each other.

In the same manner other hydrocarbon products, as distillation residues, tars, pitches, etc. may be contacted not only with air, but also with other gases, as oxygen, ozone, nitrogen oxides, sulphur dioxide, chlorides, etc.

The advantages of my process will be clear from the above description. The blowing in this way is quicker and more economical; a better contact is obtained between air and asphalt, no special stirring mechanism is needed, and less air is sufficient to obtain material of the same quality. Further, the danger of explosions is greatly diminished, as working conditions are more uniform and can easily be controlled.

I claim as my invention:

1. A process of forming oxidized asphalt, comprising: passing a stream of asphaltic oil through a heating zone, then to a vapor separating zone, and back to the heating zone, continuously introducing at least one regulated stream of air into the circulating oil at an intermediate point in the heating zone, removing air and vapors from the asphalt in the vapor separating zone, continuously introducing untreated asphaltic oil directly into the circulating oil stream, and withdrawing oxidized asphalt from the vapor separating zone.

2. A process of forming oxidized asphalt, comprising: passing a stream of asphaltic oil through a heating zone, then to a vapor separating zone, and back to the heating zone, continuously introducing regulated streams of air into the circulating oil before and during its passage through the heating zone, removing air and vapors from the asphalt in the vapor separating zone, continuously introducing untreated asphaltic oil into the circulating oil, and withdrawing oxidized asphalt from the vapor separating zone.

In testimony whereof I have affixed my signature.

HERMAN THEODOOR SWERISSEN.